(No Model.)
E. NORTON.
CAN CAP SOLDERING MACHINE.
No. 408,252. Patented Aug. 6, 1889.
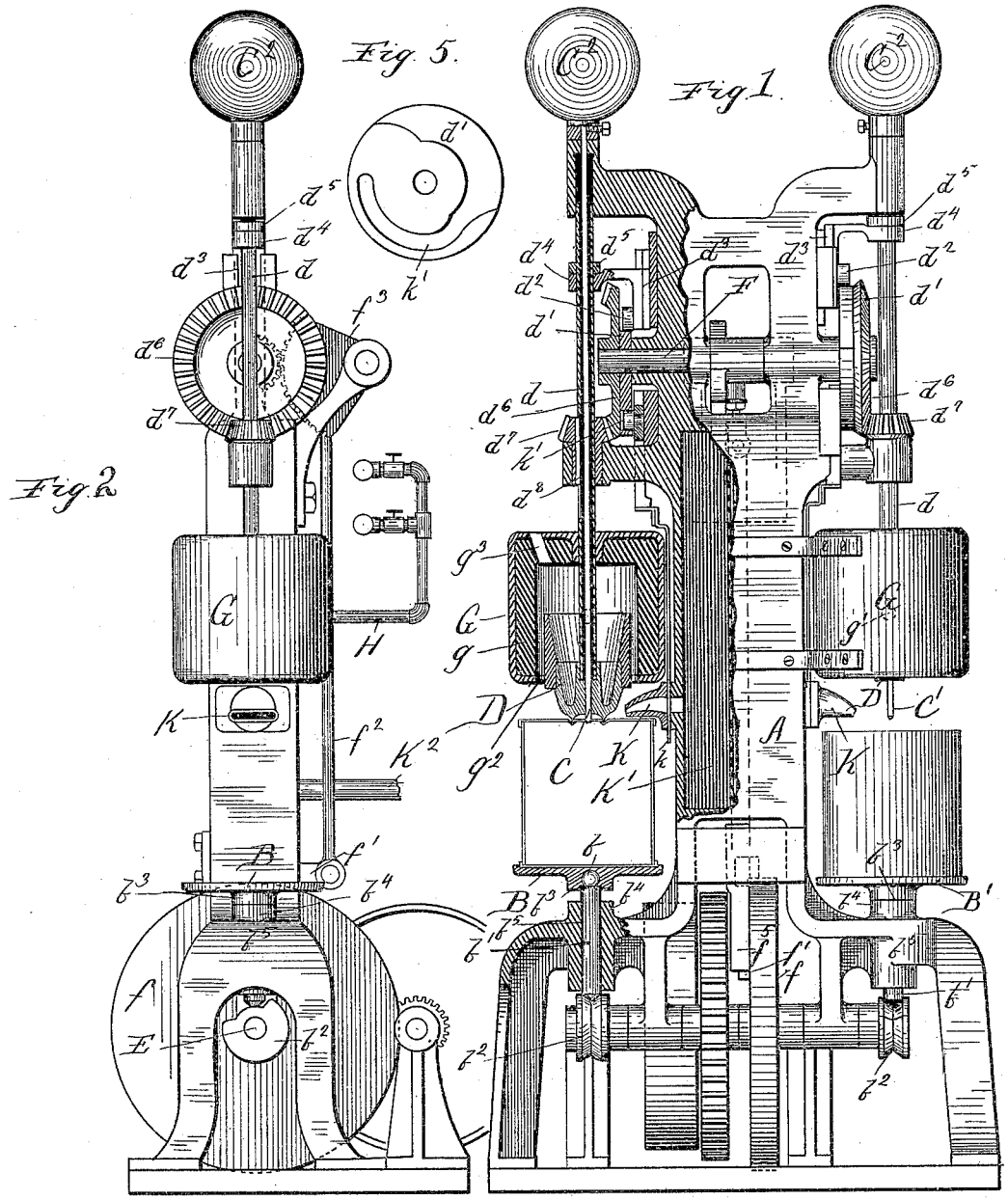
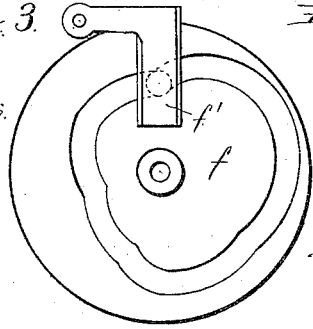
Witnesses:
Inventor
Edwin Norton
By Munday, Evarts and Adcock
his Attorneys

UNITED STATES PATENT OFFICE.

EDWIN NORTON, OF MAYWOOD, ASSIGNOR TO HIMSELF, AND OLIVER W. NORTON, OF CHICAGO, ILLINOIS.

CAN-CAP-SOLDERING MACHINE.

SPECIFICATION forming part of Letters Patent No. 408,252, dated August 6, 1889.

Application filed October 1, 1888. Serial No. 286,917. (No model.)

*To all whom it may concern:*

Be it known that I, EDWIN NORTON, a citizen of the United States, residing in Maywood, in the county of Cook and State of Illinois, have invented a new and useful Improvement in Can-Cap-Soldering Machines, of which the following is a specification.

My invention relates to machines for soldering up the caps or final heads of filled cans.

The object of this invention is to provide a can-cap-soldering machine of a simple and cheap construction having two can-holders and two soldering-tools which operate alternately, one can being soldered while the soldered can is taken out of the other holder and replaced by an unclosed can.

My invention consists in the novel devices and novel combinations of parts and devices herein shown and described, and more particularly pointed out in the claims.

In the accompanying drawings, which form a part of this specification, and in which similar letters of reference indicate like parts, Figure 1 is a front elevation, partly in vertical section, of a machine embodying my invention. Fig. 2 is a side view. Figs. 3, 4, and 5 are detail views of parts hereinafter to be described.

In said drawings, A represents the frame of the machine; B and B', two alternately vertically-movable can holders or chucks; C C', the cap-holder rods; D D', two alternately vertically-movable hollow rotatable soldering irons or tools, through which the cap-holder rods C C' extend.

The can holders or chucks B B' are connected, preferably by a ball-and-socket or other universal joint $b$ with their supporting spindles or stems $b'$, so that when the annular-edged soldering-tools D D' are brought to bear upon the cap-groove of the can the can may accommodate itself to the tool, and the tool thus be made to fit or bear evenly against the whole circumference of the cap or cap-groove in the can-head.

The can-holders B B' are moved up and down alternately by cams $b^2$ on the driving-shaft E, the sliding stems $b'$ resting upon said cams.

The soldering tools or irons D D' are secured by screw-threads or otherwise to hollow sliding spindles $d$, which are alternately moved up and down by cams $d'$ on the rock-shaft F, said cams impinging against pins or friction-rollers $d^2$ in the slides $d^3$, which are connected to the hollow spindles $d$. As the spindle $d$ revolves or oscillates on its axis, the arm or projection $d^4$ of the slide $d^3$ is not fixed rigidly to the hollow spindle, but bears under a collar $d^5$ on the spindle, so that the spindle may turn or revolve. The hollow spindles $d$ $d$ are rotated part of a revolution one way and then back, to give the soldering-tools D D' practically the same oscillating or rotary movement as they are ordinarily given by hand of the operator in hand-soldering, by means of bevel-gears $d^6$ on the rock-shaft F, which mesh with bevel-gears $d^7$ on the spindles $d$. The gears $d^7$ are splined to the spindles $d$, as shown at $d^8$, or otherwise so made as to permit of the sliding movement of the spindles before described.

The rock-shaft F is oscillated from the main shaft E by means of a cam $f$, slide $f'$, and connecting-rod $f^2$, which is pivoted to the segment-gear $f^3$, that meshes with a segment-gear $f^4$ on the rock-shaft F. The slide $f'$ reciprocates in suitable guides $f^5$ on the frame A.

When the can-holder B or B' is at its lowermost position, the shoulder or hub $b^3$ thereon rests upon the flat boss $b^4$ of the guide $b^5$, in which the stem $b'$ slides, which thus keeps the can-holder disk in a level position. The joint or connection $b$ between the holder-disk and its stem should, however, only be adapted to permit a slight oscillation of the can-holder disk, as a very slight movement is all that is required to permit the can to fit and adapt itself squarely against the soldering-tool.

G G are hollow heating chambers or cases attached to the frame of the machine, and within which chamber the soldering-tools D D' are alternately withdrawn. These heating-chambers are preferably lined with fire-clay $g$ to better retain and confine the heat. The heating-chambers G have openings $g'$, through which the gas jets or burners H project. The soldering-tools D or D' project out through the large openings $g^2$ at the base of the cases G. The cases G are also furnished with openings $g^3$ near their top for the escape of the products of combustion, so that there may be a better supply of air to the burners within the heating-chambers.

K is an air jet, nozzle, or pipe for cooling the soldered seam. The nozzle K is attached to the frame A, which is hollow, having an interior closed chamber K', into which air is admitted from the air-supply pipe $K^2$. Each of the nozzles K is furnished with a valve $k$, which are operated alternately to close first one and then the other of said nozzles by means of a cam $k'$ on the cam-wheel $d'$.

As the soldering-tool is withdrawn within the heating-chamber G after the soldering operation, it is readily kept in a proper heated condition. The heating-chamber should be sufficiently larger than the soldering-tool to leave an annular space for the flame within the chamber around the tool. While the tool is withdrawn within the chamber and being heated the rock-shaft F gives it a rotary or oscillating movement, so that it will be more evenly heated.

The cap-holder rod C, which extends down through the soldering-tool D and its hollow spindle $d$, is furnished with a weight $C^2$, which serves to hold the can-cap $x$ in place on the can X. The cap-holding rod C need have no vertical movement excepting sufficient to accommodate inequalities in the height of the cans.

In operation, as the can-holders B B' are alternately raised, the can-cap comes in contact with the holder-rod C, and then the soldering-tool D or D' descends against the seam, at the same time rotating backward and forward. As the soldering-tool D ascends within its heating-chamber, the valve of the cooling-nozzle K is opened by the cam $k'$, and at the same time the other soldering-tool D' descends to solder the other can upon the holder B'. The cap-holding rod C serves to press the cap firmly in its seat upon the can-head while the seam is being cooled and the solder setting.

By combining the reciprocating can-holder with the reciprocating soldering-tool, the heating-chamber, cap-holder rod, and cooling device the joint may be heated and soldered without bringing the can into such close proximity with the heating-chamber as to endanger the discolorization or injury of the tin by the flame issuing from said chamber, and at the same time the soldering-tool may be withdrawn within the heating-chamber to keep the same hot and the can in the holder removed from proximity to the heating-chamber and the soldering-tool, thus rendering it more convenient to place the can upon the holder, as well as facilitating both the soldering and cooling operation and increasing the capacity of the machine. The withdrawing of the soldering-tool within the heating-chamber and the movement of the can-holder to withdraw the can from the heating-chamber both facilitate the cooling and setting of the solder, and thus increase the capacity of the machine. The valves which open and close the cooling-nozzle are operated alternately, so that while the can on one holder is being soldered that upon the other may be cooled, and also so that the cold-air blast will not be projected against the soldering-tool.

In my invention the heating-chamber and the cooling device are both mounted on the stationary frame of the machine, and I combine with such stationary heating and cooling devices an adjustable stationary cap-holder rod, a reciprocating can-holder, and a reciprocating revolving soldering-tool, so that the can may be moved into position for being acted upon by the soldering-iron and by the cooling device, the can-cap being held and pressed in place by the cap-holder rod during both the soldering and cooling operations, and so that after the soldering operation the can may be cooled before it is moved and the soldering-iron be withdrawn into the heating-chamber during the cooling operation. By the combination of the reciprocating can-holder with the reciprocating soldering-tool and the stationary cap-holder rod the movement of the can-holder serves to clamp the cap in place by contact with the cap-holder rod, while the movement of the soldering-iron serves to bring it into contact with the joint and to withdraw the soldering-tool within the heating-chamber after the soldering operation is completed.

I claim—

1. The combination, with a pair of alternately vertically-movable can-holders, of a pair of alternately vertically-movable soldering-irons, substantially as specified.

2. The combination, with a pair of alternately vertically-movable can-holders, of a pair of alternately vertically-movable soldering-irons and a pair of cap-holder rods extending through said soldering-tools, substantially as specified.

3. The combination, with a pair of rotatable soldering-tools, of a pair of alternately vertically-reciprocating can-holders, substantially as specified.

4. The combination, with a pair of can-holders, of a pair of alternately vertically-reciprocating soldering-tools, substantially as specified.

5. The combination, with a pair of can-holders, of a pair of alternately vertically-reciprocating soldering-tools and a pair of cap-holder rods extending down through the soldering-tools, substantially as specified.

6. The combination, with a pair of can-holders, of a pair of alternately vertically-reciprocating soldering-tools, a pair of cap-holder rods extending down through the soldering-tools, a pair of cooling-nozzles, and a pair of alternately-operated valves for opening and closing said cooling-nozzles, substantially as specified.

7. The combination, with a stationary heating-chamber and a stationary cooling device on the frame of the machine, of a reciprocating can-holder, a hollow reciprocating revolving soldering-tool adapted to move in and out of said heating-chamber and revolve within it, and a cap-holder rod extending through said heating-chamber and hollow soldering-tool, substantially as specified.

8. The combination of a stationary heating-chamber with a hollow reciprocating revolving soldering-tool adapted to move in and out of said heating-chamber and revolve within it, a reciprocating can-holder, and a cap-holder rod extending through said heating-chamber and said hollow soldering-tool, the movement of the can-holder serving to clamp the can-cap in place, substantially as specified.

9. The combination, with a pair of can-holders, of a pair of heating-chambers and a pair of rotatable alternately-reciprocating soldering-tools, substantially as specified.

10. The combination, with a pair of can-holders, of a pair of air-blowing cooling-nozzles and a pair of alternately-operated valves for opening and closing said nozzles, substantially as specified.

11. The combination, with a can-holder, of a cooling nozzle or pipe, a valve for opening and closing the same at intervals, a revolving reciprocating soldering-tool, means for automatically reciprocating and revolving said tool, and means for automatically operating said valve at intervals when the reciprocating soldering-tool is withdrawn from contact with the can, substantially as specified.

12. The combination, with a reciprocating can-holder, of a revolving reciprocating soldering-tool, a cooling-pipe, a valve for opening and closing said pipe, means for automatically reciprocating said can-holder, means for automatically revolving and reciprocating said soldering-tool, and means for automatically operating said valve at intervals when the soldering-tool is withdrawn from contact with the can, substantially as specified.

13. The combination, with a pair of soldering-tools, of a pair of alternately vertically-reciprocating can-holders, substantially as specified.

EDWIN NORTON.

Witnesses:
H. M. MUNDAY,
EDMUND ADCOCK.